US010417989B2

(12) United States Patent
Fear

(10) Patent No.: US 10,417,989 B2
(45) Date of Patent: Sep. 17, 2019

(54) GPU AND GPU COMPUTING SYSTEM FOR PROVIDING A VIRTUAL MACHINE AND A METHOD OF MANUFACTURING THE SAME

(71) Applicant: Nvidia Corporation, Santa Clara, CA (US)

(72) Inventor: Andrew Fear, Austin, TX (US)

(73) Assignee: Nvidia Corporation, Santa Clara, CA (US)

( * ) Notice: Subject to any disclaimer, the term of this patent is extended or adjusted under 35 U.S.C. 154(b) by 371 days.

(21) Appl. No.: 14/146,634

(22) Filed: Jan. 2, 2014

(65) Prior Publication Data
US 2015/0187041 A1    Jul. 2, 2015

(51) Int. Cl.
*G09G 5/00*   (2006.01)
*G06F 9/451*   (2018.01)
*G06F 3/14*   (2006.01)
*G09G 5/36*   (2006.01)

(52) U.S. Cl.
CPC .......... *G09G 5/001* (2013.01); *G06F 3/1454* (2013.01); *G06F 9/451* (2018.02); *G06F 9/452* (2018.02); *G09G 5/363* (2013.01); *G09G 2340/12* (2013.01); *G09G 2360/08* (2013.01); *G09G 2370/16* (2013.01); *Y10T 29/49169* (2015.01)

(58) Field of Classification Search
None
See application file for complete search history.

(56) References Cited

U.S. PATENT DOCUMENTS

| | | | |
|---|---|---|---|
| 2010/0001995 A1* | 1/2010 | Hamill | G06T 15/005 345/419 |
| 2010/0269039 A1* | 10/2010 | Pahlavan | G06F 3/0481 715/702 |
| 2012/0005269 A1* | 1/2012 | Janssen | G06F 3/0481 709/203 |
| 2013/0033496 A1* | 2/2013 | Raveendran | G06F 3/1407 345/428 |
| 2015/0134774 A1* | 5/2015 | Lection et al. | 709/217 |
| 2015/0179143 A1* | 6/2015 | Subramaniam | H04L 67/025 345/2.3 |

OTHER PUBLICATIONS

Parallels. (n.d.). Retrieved Jul. 16, 2015, from http://download.parallels.com/desktop/v7/ga-locales/documentation/en_US/Parallels Desktop Advanced VM Configuration.pdf.*
Parallels Desktop® 8 for Mac User's Guide. N.p.: N.p., N.d. PDF. N.p.: n.p., 2012. PDF.*
Full screen. (Nov. 7, 2013). Retrieved from https://en.wiktionary.org/w/index.php?title=full_screen&oldid=23803304.*
Half-Life [PDF]. (n.d.). Sierra Studios. Note: Half Life was released in 1998.*

* cited by examiner

*Primary Examiner* — Vu Nguyen

(57) ABSTRACT

Disclosed herein is a GPU for improved multitasking by a user, a GPU computing system including the GPU and a method of manufacturing a GPU system. In one embodiment, the GPU includes: (1) a video overlayer configured to create an operating area over a portion of a video image generated by the graphical processing unit and (2) an overlay interface configured to provide a virtual space input to the video overlayer to operate a virtual machine within the operating area.

16 Claims, 2 Drawing Sheets

GPU AND GPU COMPUTING SYSTEM FOR PROVIDING A VIRTUAL MACHINE AND A METHOD OF MANUFACTURING THE SAME

TECHNICAL FIELD

This application is directed, in general, to computer gaming and, more specifically, to multitasking while playing a computer game.

BACKGROUND

Video gaming, played on a local gaming device (such as a personal computer), is a rapidly growing commercial field that is receiving a great deal of attention due to its universal interest and appeal. Video games can provide an immersive experience for users in a full screen mode, not allowing access to the user interface of the desktop operating system. Some users, however, may want to do something else while playing a game. For example, a user may want to e-mail, browse the web or use another application in addition to the video game.

SUMMARY

In one aspect, the disclosure provides a GPU. In one embodiment, the GPU includes: (1) a video overlayer configured to create an operating area over a portion of a video image generated by the graphical processing unit and (2) an overlay interface configured to provide a virtual space input to the video overlayer to operate a virtual machine within the operating area.

In another aspect, the disclosure provides a method of manufacturing a GPU system. In one embodiment, the method includes: (1) coupling a central processing unit to a data bus of the computing system and (2) coupling a graphics processing unit to the data bus, wherein the graphics processing unit includes a video overlayer configured to create an operating area over a portion of a video image generated thereby, and an overlay interface configured to deliver a virtual space input to the video overlayer to provide a virtual machine within the operating area.

In yet another aspect, the disclosure provides a GPU computing system. In one embodiment, the GPU computing system includes: (1) a central processing unit and (2) a graphics processing unit coupled to the central processing unit and including (2A) a video overlayer configured to create an operating area over a portion of a video image generated by the graphical processing unit and (2B) an overlay interface configured to deliver a virtual space input to the video overlayer to provide a virtual machine within the operating area.

BRIEF DESCRIPTION

Reference is now made to the following descriptions taken in conjunction with the accompanying drawings, in which.

DETAILED DESCRIPTION

Some gamers employ multiple monitors to allow multitasking when playing a game. This, however, requires an additional monitor. Additionally, some operating systems may not operate properly and allow access to the desktop user interface with full screen applications and multiple monitors.

Various customized software is also available to allow a user to perform some functions while playing a game on a single monitor. The software, however, is directed to accessing particular applications, such as for web browsing, e-mail, etc. As such, a gamer is limited in his ability to multitask.

The disclosure recognizes the present limitations to multitasking for gamers and provides an operating area within a screen that employs its own operating system. Thus, the gamer can multitask while gaming and not be limited by customized applications or require additional monitors. Instead, the gamer can perform multiple functions through the operating system dedicated to the operating area.

Accordingly, the disclosure provides an operating area overlayed on a game that has a separate operating system from the game. The operating area, therefore, provides a virtual machine that allows a gamer to have a dedicated operating system when playing games or to even stream an operating system from another device, such as a mobile device. As used herein, a virtual machine is a self-contained operating environment that presents the appearance to a user (or a gamer) of a different computer. A virtual machine provides a complete system platform which supports the execution of a complete operating system which emulates an existing architecture, and is built with the purpose of providing a platform to run additional programs through the use of shared computer resources. With the operating area disclosed herein, game developers do not have to change their software. Instead, the operating area is provided by the GPU and associated software and allows a gamer to launch the operating area having a separate operating system from games.

Figure 1:
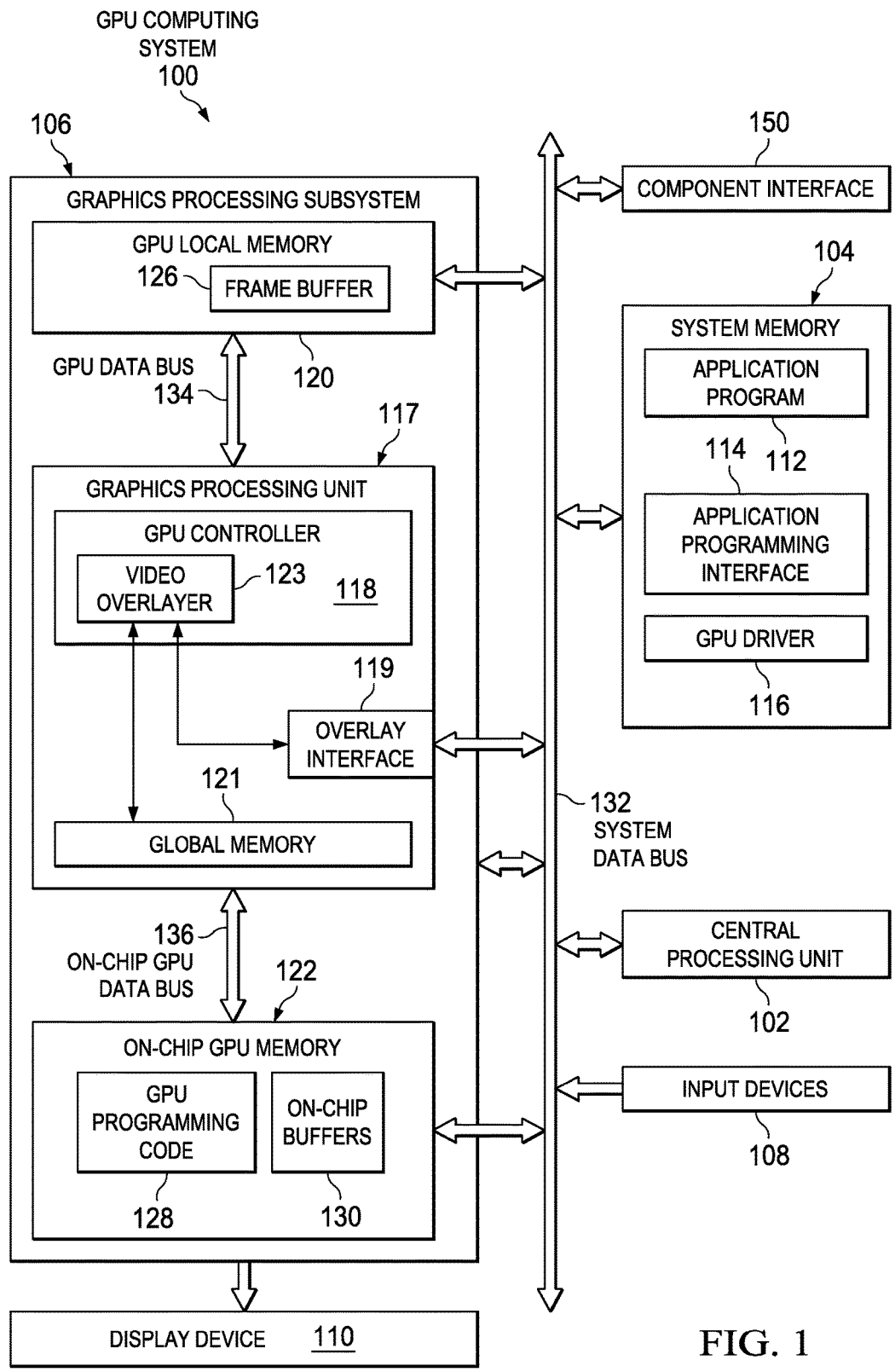
FIG. 1 is a block diagram of one embodiment of a GPU computing system in which one or more aspects of the embodiments disclosed herein may be implemented.

FIG. 1 is a block diagram of one embodiment of a GPU computing system 100 in which one or more aspects of the embodiments disclosed herein may be implemented. In different embodiments, the GPU system 100 can be a game device, a personal computer, a lap top, a smart phone and a computing tablet. The GPU system 100 provides a virtual machine for a user to employ while using the GPU system 100. As such, a gamer can simultaneously play a video game via the GPU system 100 and also perform additional functions through the virtual machine.

The GPU computing system 100 includes a system data bus 132, a central CPU 102, input devices 108, a system memory 104, a graphics processing subsystem 106 including a graphics processing unit (GPU) 117, a display device 110 and a component interface 150. In alternate embodiments, the CPU 102, portions of the graphics processing subsystem 106, the system data bus 132, or any combination thereof, may be integrated into a single processing unit. Further, the functionality of the graphics processing subsystem 106 may be included in a chipset or in some other type of special purpose processing unit or co-processor.

As shown, the system data bus 132 connects the CPU 102, the input devices 108, the system memory 104, and the graphics processing subsystem 106. In alternate embodiments, the system memory 100 may connect directly to the CPU 102. The CPU 102 receives user input from the input devices 108, executes programming instructions stored in the system memory 104, operates on data stored in the system memory 104, sends instructions and/or data (i.e., work or tasks to complete) to the graphics processing unit 117 to complete and configures needed portions of the graphics processing system 106 for the GPU 117 to complete the work. The system memory 104 typically includes dynamic random access memory (DRAM) used to store programming instructions and data for processing by the CPU 102 and the graphics processing subsystem 106.

The GPU 117 receives the transmitted work from the CPU 102 and processes the work. In one embodiment, the GPU 117 completes the work in order to render and display graphic images on the display device 110. For example, the GPU 117 can render video frames for the display device 110 from a game program stored in the system memory 104. In other embodiments, the graphics processing subsystem 106 can be used for non-graphics processing. Parallel processors of the GPU 117 are employed for processing the work.

As also shown, the system memory 104 includes an application program 112, an application programming interface (API) 114, and a graphics processing unit (GPU) driver 116. The application program 112 generates calls to the API 114 in order to produce a desired set of results, such as a sequence of graphics images.

The graphics processing subsystem 106 includes the GPU 117, an on-chip GPU memory 122, an on-chip GPU data bus 136, a GPU local memory 120, and a GPU data bus 134. The GPU 117 is configured to communicate with the on-chip GPU memory 122 via the on-chip GPU data bus 136 and with the GPU local memory 120 via the GPU data bus 134. As noted above, the GPU 117 can receive instructions from the CPU 102, process the instructions in order to render graphic images or data, and store these images or resulting data in the GPU local memory 120. Subsequently, the GPU 117 may display certain graphic images or data stored in the GPU local memory 120 on the display device 110.

The GPU 117 includes a GPU controller 118, an overlay interface 119 and a global memory 121. The controller 118 is configured to assist in operating the GPU 117. The controller 118 includes the necessary logic, via hardware, software or a combination thereof, to manage the rendering of graphic images for the display 110. The GPU controller 118 includes a video overlayer 123 that is configured to create an operating area over a portion of a video image generated by the GPU 117. The video overlayer 123 is further configured to receive a virtual space input from the overlay interface 119 and provide that input onto the display 110 within the operating area. Thus, using a video game as an example, the video overlayer 123 is configured to create an operating area, within the video image or video of the game provided to the display device 110, that is designated for a virtual machine. The operating area, therefore, provides a display area for the virtual machine while the user is playing the video game. The video overlayer 123 can include dedicated video hardware that is configured to display a video image from the input received. The video overlayer 123 can be a hardware overlay of a graphics processing unit, such as the hardware overlay of a GeForce graphics processing unit from Nvidia Corporation of Santa Clara, Calif. As such, the video overlayer 123 is configured to provide composite video or other sources onto a fullscreen image of the display device 110.

The overlay interface 119 is configured to provide the virtual space input to the video overlayer 123 to operate the virtual machine within the operating area. As such, the overlay interface 119 designates or delivers the virtual space input for operating the virtual machine. The overlay interface 119 can be implemented as software, hardware or a combination thereof that is configured to direct the virtual space input to the video overlayer 123 to provide the virtual machine within the operating area. In FIG. 1, the overlay interface 119 is implemented within the GPU 117. The overlay interface 119 can be a programming abstraction. In some embodiments, the overlay interface 119 or a portion thereof is implemented within another part of the GPU system 100, such as the GPU driver 116.

In one embodiment, the overlay interface 119 is configured to provide the virtual space input from a portion of a processor, such as the CPU 102, coupled to the GPU 117 via the system data bus 132. Thus, in one embodiment the overlay interface 119 designates a portion of the CPU 102 to operate the virtual machine. For example, the CPU 102 may be a 500 gigabyte hard drive and the overlay interface 119 designates 50 gigabytes of the CPU 102 to operate the virtual machine.

In one embodiment, the overlay interface 119 includes a wireless transceiver. The wireless transceiver can be a screen casting device that is configured to stream data from a mobile computing device that is then provided to the video overlayer 123 for the operating area. The wireless transceiver can be a Miracast device or another type of screen casting device. Thus, in some embodiments the overlay interface 119 can receive the virtual space input from a mobile computing device and provide or direct this input to the video overlayer 123 for the virtual machine.

The virtual machine employs a separate operating system than one used by the GPU system 100. In some embodiments, the separate operating system employed for the virtual machine is from a mobile computing device. In other embodiments, the separate operating system is employed by the portion of the CPU 102 designated to operate the virtual machine.

Accordingly, the GPU 117 can employ a first operating system to generate the video image for the display device 110 and the virtual machine employs a separate or second operating system from the first operating system. The first operating system and the second operating system can be the same type of operating system. For example, each of the operating systems can be a Microsoft Windows operating system. In some embodiments, the first and second operating systems are different types of operating systems. For example, the first operating system can be a Microsoft Windows operating system and the second operating system can be a Linux based operating system. As discussed herein, the first operating system can be for a personal computer and the second operating system can be the operating system of a mobile computing device, such as via Miracast streaming or another screen casting device.

The operating area can be at a fixed location within the fullscreen image of the display device 110. In some embodiments, the operating area can move within the fullscreen image based on activity by the user. Accordingly, the operating area can be dynamically positioned in the fullscreen image to avoid the attention area of a gamer. The gamer's attention area can be based on the location of game markers, Heads-Up-Display or User Interface elements within the video frames.

The GPU 117 may be provided with any amount of on-chip GPU memory 122 and GPU local memory 120, including none, and may use on-chip GPU memory 122, GPU local memory 120, and system memory 104 in any combination for memory operations. The CPU 102 can allocate portions of these memories for the GPU 117 to execute work. The on-chip GPU memory 122 is configured to include GPU programming code 128 and on-chip buffers 130. The GPU programming code 128 may be transmitted from the GPU driver 116 to the on-chip GPU memory 122 via the system data bus 132.

The GPU local memory 120 typically includes off-chip dynamic random access memory (DRAM) and can be used to store data and programming used by the GPU 117. As shown, the GPU local memory 120 includes a frame buffer 126. The global memory 121 can be a programming abstraction. In one embodiment, the global memory 121 can be physically located on the on-chip memory 122. In other embodiments, the global memory 121 is physically located on the local memory 120. In yet other embodiments, the global memory 121 can be physically located on both the on-chip memory 122 and the local memory 120.

Figure 2:
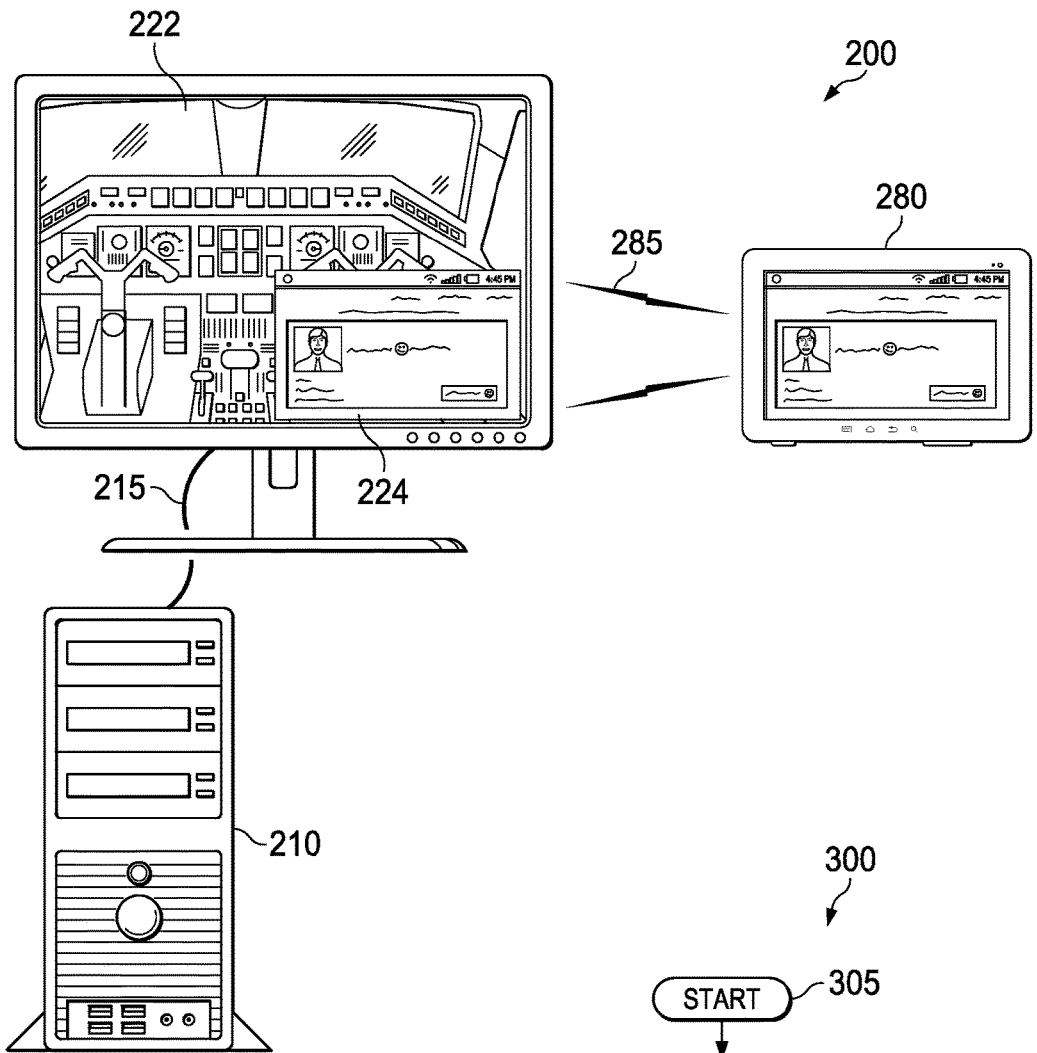
FIG. 2 illustrates a diagram of an embodiment of a computer system constructed according to the principles of the disclosure.

The display device 110 is an output device capable of emitting a visual image corresponding to an input data signal. For example, a display device may be built using a cathode ray tube (CRT) monitor, a liquid crystal display, or any other suitable display system. The input data signals to the display device 110 are typically generated by scanning out the contents of one or more video frames of image data that is stored in the frame buffer 126. As discussed above, an operating area is designated in the video frames to provide for the virtual machine. FIG. 2 provides a view of a display device that shows an operating area overlayed on a video frame of a video game.

The component interface 150 is configured to provide communication between components or devices and the GPU computing system 100. The component interface 150 can be a conventional communications interface that includes the necessary software, hardware or combination thereof to transmit and receive data over wireless or wired connections between the GPU computing system 100 and a component or device. In one embodiment, the component interface 150 is configured to communicate with a smart phone, a tablet, a computing pad or another type of mobile computing device.

The input devices 108 allow a user to enter a request or command that is received by the GPU controller 118 and in response thereto creates the operating area in the video frames. The request can be an input generated by a designated keystroke or keystrokes, a mouse, a game device, a touchpad, etc. An additional input can be generated by the input devices 108 and received by the GPU controller 118 to activate the virtual machine. This activation input can be from clicking a cursor or game marker that is moved into the operating area. Various input devices can be used to enter both the request and activation inputs. The input devices 108 can be conventional input devices associated with video games and computers.

For example, a cursor or a game marker, such as crosshairs, can be moved into the operating area and "clicked" or initiated to activate the virtual machine. Accordingly, a gamer can be playing a game, move the crosshairs into the operating area, and pull a trigger of an input device to activate the virtual machine. The gamer can then continue to play the game while also performing various tasks through the virtual machine.

FIG. 2 illustrates a diagram of an embodiment of a computer system 200 constructed according to the principles of the disclosure. FIG. 2 illustrates an operating area overlayed on a video image and the operation of a virtual machine therein according to the principles of the disclosure. The computer system 200 includes a computing device 210 and a display device 220. In one embodiment, the computer system 200 is the GPU computing system 100 of FIG. 1. In FIG. 2, the computing device 210 and the display device 220 are separate devices that are connected via a computer cable 250. In some embodiments, the computing device 210 and the display device 220 are integrated into a single unit. The computing device 210 and the display device can also be connected via a wireless connection. One skilled in the art will understand that the computer system 200 can include additional devices or components that are not illustrated in FIG. 2, such as input devices including a keyboard, mouse, pad, etc. In some embodiments, the screen of the display device 220 itself is a touchscreen for receiving user inputs. FIG. 2 also includes a mobile device 280 wirelessly coupled to the computer system.

The computing device 210 is configured to generate a video image to be displayed on the display device 220. The video image can be generated via applications stored on the computing device 210 or received via a communications network. The computing device 210 can be a personal computer that is designed to perform multiple functions according to software applications stored thereon or downloaded via a communications network. The software applications, for example can be video games. In one embodiment, the computing device 210 is a game device that is specifically designed for playing video games.

In addition to conventional functions including generating a video image, the computing device 210 is configured to provide an operating area for a virtual machine over the video image displayed on the display device 220. In one embodiment, the computing device 210 includes a video overlayer and an overlay interface, such as in FIG. 1, that is employed to create the operating area and designate a processor to operate a virtual machine within the operating area.

The display device 220 includes a screen 222 that visually provides the video image that is generated. Located within the video image and displayed on the screen 222 is the operating area 224. In this embodiment, the operating area 224 is located in the bottom right hand corner of the screen 222. In some embodiments, the location of the operating area 224 can move based on the attention area of a gamer or the location of action or information on the screen 222 for the video game. In FIG. 2, the shape of the operating area 224 is fixed. In other embodiments, the shape of the operating area 224 can vary. In some embodiments, the shape can vary based on input from a user by selecting a particular shape during set-up. In other embodiments, the shape of the operating area is based on, the shape of a particular mobile device that is streaming content into the operating area 224. Thus, the shape of the operating area 224 can change when different mobile devices are employed for streaming. In one embodiment, the aspect ratio of the virtual machine is related to the resolution on the screen 222. For instance, if the resolution is 1280×720, the aspect ratio is 16:9 and that would be the size of the operating area.

The mobile device 280 is a conventional mobile device that is configured to communicate with the computer system 200 via a wireless connection 285, such as a wireless local area network (WLAN) connection. The mobile device 280 is a computing tablet. One skilled in the art will understand that the mobile device can be another type of mobile device that is configured to communicate with the computer system 200. For example, the mobile device can be a smart phone. The wireless connection 285 can be a conventional connection that supports screen casting, such as Miracasting.

The virtual machine operating within the operating area 224 employs a different operating system than the operating system used to generate the video frames on the screen 222.

The operating system can be associated with the operating system of a processor that is designated for the virtual machine. In other embodiments, the operating system is associated with a mobile device coupled to the computer system 200; which in FIG. 2 is the mobile device 280. This allows a gamer to use the functions of the mobile device 280 while still playing the video game. Accordingly, the virtual machine operating within the operating area 222 can be streamed from the mobile device 280 via the wireless connection 285. The operating system of the virtual machine in this embodiment would be the operating system of the mobile device 280. In one embodiment, the operating system is Android which supports Miracast and allows streaming the operating system of the mobile device 280.

As illustrated in FIG. 2, the visual image on the mobile device 280 has been reproduced in the operating area 224. In various embodiments, the images on the mobile device 280 are streamed into the operating area 224 via screen casting such as by Miracast. Other proprietary or standard methods can also be used to stream data, such as Airplay or Simple Protocol for Independent Computer Environment (SPICE). Via screen casting, the operating area 222 mirrors the mobile device 280 and the gamer can have access to the applications, files and data that is on the mobile device 280 while still playing.

Figure 3:
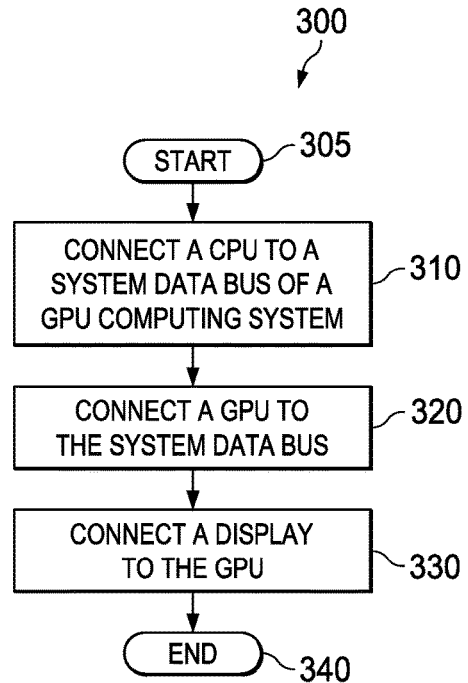
FIG. 3 illustrates a flow diagram of an embodiment of a method of manufacturing a GPU computing system carried out according to the principles of the disclosure.

FIG. 3 illustrates a flow diagram of an embodiment of a method 300 of manufacturing a GPU computing system carried out according to the principles of the disclosure. The GPU computing system may be the computing system 100 of FIG. 1 or a portion thereof. The method begins in a step 305.

In a step 310, a CPU is connected to a system data bus of the GPU computing system. In a step 320, a GPU is coupled to the system data bus. The GPU includes a video overlayer configured to create an operating area over a portion of a video image generated thereby and an overlay interface configured to deliver a virtual space input to the video overlayer to provide a virtual machine within the operating area. The virtual space input is data, such as streaming data, that is sufficient to operate a virtual machine. The virtual space input can be from a portion of the CPU that is designated to operate the virtual machine. In another embodiment, the virtual space input can be from a mobile computing device.

In a step 330, a display is connected to the GPU. The display can simultaneously provide the video image and the virtual machine. The method 300 ends in a step 340.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

A portion of the above-described apparatuses, systems or methods may be embodied in or performed by various processors, such as conventional digital data processors or computing devices, wherein the processors are programmed or employ stored executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computing devices to perform one, multiple or all of the steps of one or more of the above-described methods, or functions of the apparatuses described herein.

Portions of disclosed embodiments may relate to computer storage products with a non-transitory computer-readable medium that have program code thereon for performing various computer-implemented operations that embody a part of an apparatus, system or carry out the steps of a method as set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A graphical processing unit of a computing device, comprising:
   a video overlayer configured to create an operating area in full screen video frames of a game generated by said graphical processing unit employing a first operating system and a game application; and
   an overlay interface configured to receive a virtual space input from a mobile computing device and provide said virtual space input to said video overlayer to simultaneously operate a virtual machine within said operating area, while operating said game through said full screen video frames, employing an operating system of said mobile computing device that is different than said first operating system, wherein said mobile computing device is a different device than said computing device.

2. The graphical processing unit as recited in claim 1 wherein said overlay interface is configured to provide said virtual space input from a portion of a processor coupled to said graphical processing unit via a system data bus.

3. The graphical processing unit as recited in claim 2 wherein said portion is designated to operate said virtual machine.

4. The graphical processing unit as recited in claim 1 wherein said overlay interface includes a wireless transceiver that is configured to receive said virtual space input from said mobile computing device.

5. The graphical processing unit as recited in claim 1 wherein said video overlayer is configured to create said operating area in response to an input from a user.

6. The graphical processing unit as recited in claim 1 wherein said video overlayer is configured to activate said virtual machine within said operating area in response to an input from a user.

7. A method of manufacturing a graphics processing unit computing system, comprising:
   coupling a central processing unit to a data bus of said computing system;
   coupling a graphics processing unit to said data bus, wherein said graphics processing unit includes:
      a video overlayer configured to create an operating area in full screen video frames of video images generated by said graphics processing unit employing a first operating system and an application, and an overlay interface configured to deliver a virtual space input from a mobile computing device to said video overlayer to provide a virtual machine within said operating area that employs an operating system of said mobile computing device that is a different operating system than said first operating system; and coupling a display to said graphics processing unit, wherein said operating area is displayed within said video images of said application on said display to simultaneously operate said virtual machine and said application.

8. The method as recited in claim 7 further comprising designating a portion of said central processing unit to operate said virtual machine.

9. The method as recited in claim 8 wherein said wireless transceiver is Miracast compliant device.

10. The method as recited in claim 7 wherein said overlay interface includes a wireless transceiver configured to receive said virtual space input from said mobile computing device as streaming content.

11. The method as recited in claim 7 wherein said display is configured to simultaneous provide said video images and said virtual machine.

12. A graphics processing unit (GPU) computing system, comprising:

a display;

a central processing unit; and a graphics processing unit coupled to said central processing unit and including:

a video overlayer configured to create an operating area in a full screen video frame of a video image of a video game generated by said graphical processing unit employing a first operating system and a game application, wherein said operating area is simultaneously displayed within said video image on said display; and an overlay interface configured to deliver a virtual space input to said video overlayer to provide a virtual machine within said operating area, wherein said overlay interface receives said virtual space input from a mobile computing device that is different from said GPU computing system, and said virtual machine employs an operating system of said mobile computing device that is different than said first operating system to simultaneously allows operation of said virtual machine and said game in said full screen image.

13. The GPU computing system as recited in claim 12 wherein a portion of said central processing unit is designated to operate said virtual machine.

14. The GPU computing system as recited in claim 12 wherein said graphics processing unit includes a screen casting device configured to receive said virtual space input from said mobile computing device.

15. The GPU computing system as recited in claim 12 wherein said operating system of said virtual machine is streamed from said mobile computing device.

16. The GPU computing system as recited in claim 12 wherein said overlay interface includes a Miracast transceiver that streams said virtual space input from said mobile computing device.

* * * * *